Patented Sept. 12, 1944

2,358,073

UNITED STATES PATENT OFFICE 2,358,073

INSECTICIDE AND PROCESS OF PREPARING IT

Frank H. Kellner and Richard R. Williams, Houston, Tex.

No Drawing. Application June 2, 1941, Serial No. 396,327

4 Claims. (Cl. 167—24)

Our invention relates to improvements in rotenone containing insecticides and processes of preparing the same, and the primary object of our invention is the provision of insecticide formed of rotenone, derris root extractives and other toxic ingredients in water vehicles, wherein the toxic ingredients do not hydrolyze in the water, whereby the insecticides retain their full toxicity over long periods of time even when substantially diluted with water and exposed in the open and to sunlight and applied by washing, dipping, or spraying to the bodies of animals.

Other important objects and advantages of our invention will be apparent from a reading of the following description and the illustrative examples set forth therein.

One of the difficulties heretofore characterizing the preparation and utilization of water and alkali containing solutions involving rotenone or rotenone derived from derris root or rotenone derived from other rotenone bearing plants, has been the relative instability and consequently the short effective life of such preparations. This is an objectionable condition which the present invention solves and overcomes, with the result that even dilute aqueous solutions retain their toxicity for periods ranging from 60 to 90 days or longer even while exposed to sunlight and the elements in the open air and after application to animals by spraying, dipping, washing or other methods of external application to the animals.

A typical and illustrative embodiment of our invention can be prepared by three main steps as follows:

I

A potash soap is prepared by dissolving 20 pounds of caustic potash (KOH) in 480 pounds of water.

The caustic potash solution is added to 100 pounds of higher fatty acid, and heat is applied until the resultant is a clear completely saponified soap.

II 58 pounds of potassium pyro-phosphate ($K_4P_2O_7$)

is dissolved in 58 pounds of water and the solution is added to the resultant of step I, with constant stirring until a smooth jelly soap composition is obtained.

III

To the resultant of step II is added with high speed mixing 120 pounds of the following insecticidal combination:

| | Percent by weight |
|---|---|
| Rotenone | 6 |
| Derris extractives | 14 |
| Naphthyl cyclohexylamine derivatives | 20 |
| Solvents | 60 |

The high speed stirring is maintained until a concentrated combination of matter results which can be used in its concentrated form as a water soluble concentrate, or may be diluted with either hard or soft water in various proportions, and used as a dilute solution for external application to animals large and small to rid them of insects.

The percentage recited as to the "insecticidal combination" adding up to 100% has reference only to that insecticidal combination, which, within itself, is 100%. Only about 14½% of this "insecticidal combination" is contained in the final 816 ounces of finished product.

Although we have set forth and described herein preferred embodiments of our invention it is to be understood that we do not wish to limit the application of the invention thereto except as may be required by the scope of the subjoined claims.

Having described the invention, what is claimed as new is:

1. The process of making a stable rotenone insecticide which consists in forming a clear potash soap and adding thereto an aqueous solution of potassium pyrophosphate to form a jelly, then mixing rotenone with the resultant.

2. The process of making a stable rotenone insecticide which consists in dissolving caustic potash in water and adding the resultant to higher fatty material and heating to form a clear soap, then forming an aqueous potassium pyrophosphate solution and adding it with stirring to the clear soap so as to obtain a smooth jelly soap, then adding rotenone thereto with high speed mixing.

3. The process of making stable rotenone in the presence of an aqueous solution of potash soap, said process consisting in adding potassium pyrophosphate to the solution.

4. An insecticide comprising rotenone in an aqueous solution containing potash soap and potassium pyrophosphate.

FRANK H. KELLNER.
RICHARD R. WILLIAMS.